S. M. SORENSEN.
CHAIN GUARD AND SILENCER.
APPLICATION FILED FEB. 24, 1908.
952,647.
Patented Mar. 22, 1910.
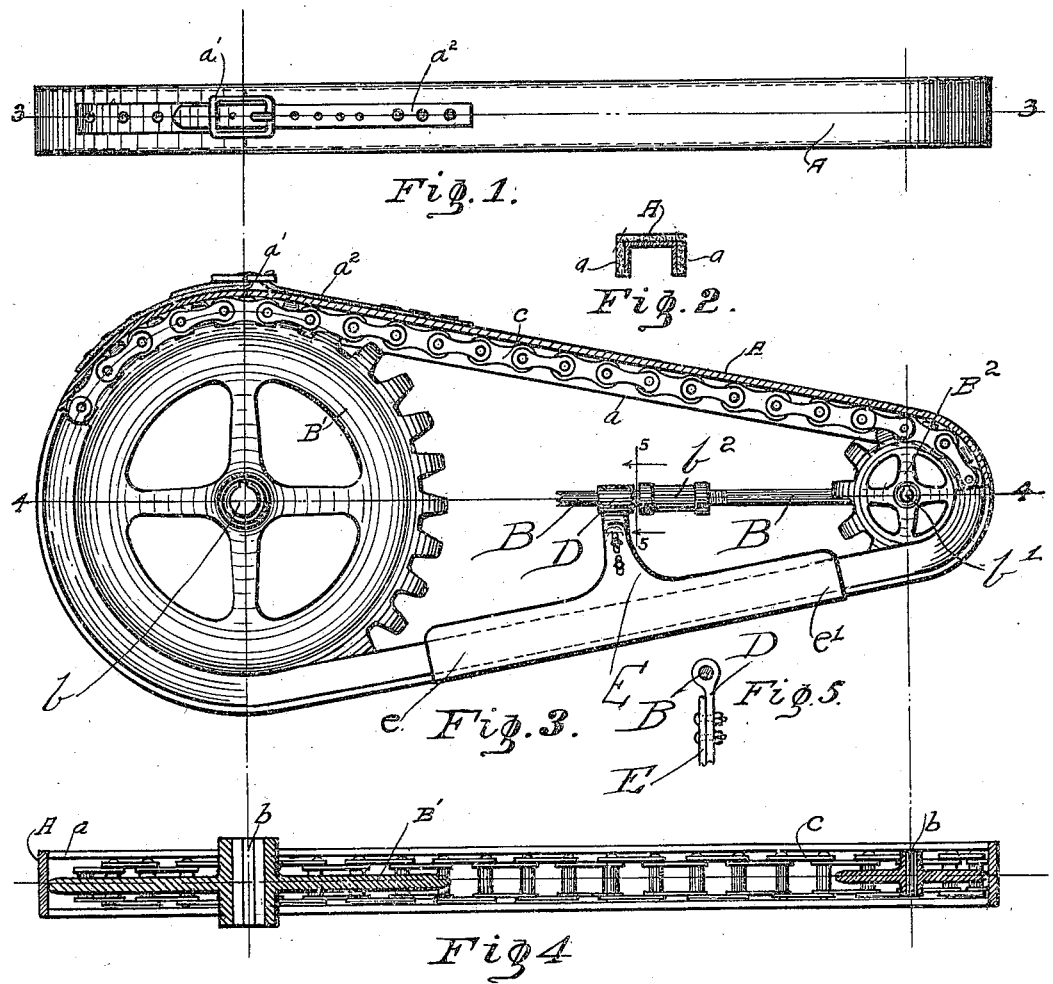

UNITED STATES PATENT OFFICE.

SAMUEL M. SORENSEN, OF CHICAGO, ILLINOIS.

CHAIN GUARD AND SILENCER.

952,647.  Specification of Letters Patent.  Patented Mar. 22, 1910.

Application filed February 24, 1908. Serial No. 417,522.

*To all whom it may concern:*

Be it known that I, SAMUEL M. SORENSEN, a citizen of the United States, and a resident of the city of Chicago, county of Cook, and State of Illinois, have invented a new and useful Improvement in Chain Guards and Silencers; and I do hereby declare that the following is a full, clear, and exact description of the same, reference being had to the accompanying drawings, and to the letters of reference marked thereon, which form a part of this specification.

A large proportion of the automobiles now in use transmit the power from the driving mechanism to the wheels by means of chains, the larger cars using two, one for each rear wheel. While the chain drive is in many respects desirable, it is quite objectionable usually owing to the noise occasioned by the slatting of the chain and by the chain running over the sprocket wheels. Furthermore driving chains and sprockets are always dirty and frequently soil or dirty the car or the clothing of those riding in or working about the car and for this reason as well as the noise occasioned by the chains and sprockets, heretofore seemingly unavoidable, many of the best makers have been led to dispense with chain drives, though not so well satisfied mechanically with other methods of propulsion.

The object of this invention is to afford a silencer and guard for the chain, the use of which obviates the noise heretofore deemed inseparable from the use of chains for the purpose.

It is a further object of the invention to afford a guard which incloses the chains on three sides, fitting closely thereto and of a material adapted to deaden or dull any noise that would otherwise be produced by the chain running over the sprocket.

It is a further object of the invention to afford a flexible chain guard adapted to be secured on the chain and to rotate therewith about the sprocket wheel, said guard protecting the chain from dirt and acting as well to retain the oil or lubricant applied to the chain.

It is a further object of the invention to afford a chain guard of the class described adjustable as to length and permitting the guard to be used upon any of several sizes of chains and sprocket wheels.

It is a further object of the invention to afford a construction to provide a guard about the sprocket inclosing the same on all sides except the inner side of the chain and to support between the sprocket wheels a suitable stationary guard adapted to exclude dirt or moisture from the lower run of the chain.

The invention consists in the matters hereinafter described and more fully pointed out and defined in the appended claim.

In the drawings: Figure 1 is a top plan view of a device embodying my invention. Fig. 2 is a transverse section of the guard and silencer to illustrate one construction thereof. Fig. 3 is a longitudinal section of the guard showing the same in place upon the sprocket wheels and showing the inner or stationary guard in place. Fig. 4 is a section taken on line 4—4 of Fig. 3 with parts omitted. Fig. 5 is a section taken on line 5—5 of Fig. 3 with parts omitted.

As shown in the drawings: said guard comprises a strap or belt of greater width than the chain and having stitched on each side thereof narrower strips or straps $a$, as shown in Fig. 2, said belt or strap A being of a width greater than the chain $c$ and the side or marginal straps $a$, being of a width greater than the thickness of the chain, thus affording a trough shaped belt.

Secured on the outer side of the belt A at one end thereof, is a buckle $a'$, and at the opposite end of the belt and adapted to engage in the buckle is riveted or otherwise secured a strap $a^2$, provided with a plurality of longitudinally disposed apertures therein in any of which the tongue of the buckle may engage and which thereby permits the guard or silencer to be adjusted to meet the requirements of the chain or construction to which it is to be applied. As shown also, the distance rods B whereby the sprocket wheels B'—B² are held the required distance apart, is provided with an apertured turn buckle $b^2$, whereby the shafts $b$—$b'$ for said sprocket wheels may be adjusted relatively to each other to tighten the chain $c$.

Rigidly supported on the distance rod B is a hanger D, the lower end of which is adjustably connected with a guard E, for the lower lap of the chain. Said guard E comprises a downwardly facing trough shaped or channel bar, the arms $e$—$e'$ of which extend approximately the entire distance between the sprocket wheels effectively covering and protecting the lower lap of the chain and excluding dirt, water etc., from falling into the lower lap of the flexible guard. The arms e—e' may of course, be adjustable to and from the sprocket wheels, which construction is so simple as to not need illustrating.

The operation is as follows: The silencer and guard made of flexible rubber, rawhide, chrome leather or other suitable material is stretched about around the sprocket wheels inclosing the chains on the outer sides thereof, as clearly shown and is adjusted as to length by means of the buckle and strap $a'$—$a^2$. Inasmuch as the guard is of soft and flexible material it tends to hold the chains from slatting or rattling and of itself, owing to the nature of the material used, can occasion no noise when slapped by the chain and is always thoroughly lubricated by the lubricant employed for the chain and sprocket, the noise heretofore produced by the chains, as described, can be entirely avoided. Furthermore inasmuch as the guard retains the oil, the lubrication insures the maximum efficiency of the chain drive thereby, and inasmuch as the chain is covered on three sides by soft and flexible material, it follows first, that very little, if any, dirt can fall upon the chain and second, that the guard continually wipes the outer surface and sides of the chain, assisting in removing therefrom any dirt that might otherwise cause injury. Of course, also, water and mud are excluded from the lower run of the chain inasmuch as the stationary guard E fits over the lower run of the guard and chain entirely protecting the same and also acting to direct any material that might fall from the upper run of the guard first upon the stationary guard, from whence it falls without reaching the chain.

Of course, details of construction may be varied and it is quite evident that leather, rubber, rawhide or other suitable material may be used and many other details of construction may be varied without departing from the principles of this invention.

I claim as my invention:

A chain guard comprising a trough shaped belt of flexible material, coacting means at the ends of the belt adapted to vary the tension of the belt on the chain and to retain the belt on the chain and a stationary guard inclosing three sides of the belt, one of said sides being the open part of the belt.

In testimony whereof I have hereunto subscribed my name in the presence of two subscribing witnesses.

SAMUEL M. SORENSEN.

Witnesses:
C. W. HILLS,
HAROLD OSBORNE.